US007086061B1

(12) United States Patent
Joshi et al.

(10) Patent No.: US 7,086,061 B1
(45) Date of Patent: Aug. 1, 2006

(54) STATISTICAL TRACKING OF GLOBAL SERVER LOAD BALANCING FOR SELECTING THE BEST NETWORK ADDRESS FROM ORDERED LIST OF NETWORK ADDRESSES BASED ON A SET OF PERFORMANCE METRICS

(75) Inventors: Prajakta Suresh Joshi, Santa Clara, CA (US); Sunanda Lakshmi Kommula, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 632 days.

(21) Appl. No.: 10/211,822

(22) Filed: Aug. 1, 2002

(51) Int. Cl.
*G06F 9/46* (2006.01)
*G06F 15/16* (2006.01)
*G06F 15/173* (2006.01)
*G06F 3/00* (2006.01)
*G06F 13/24* (2006.01)
*G06F 13/36* (2006.01)

(52) U.S. Cl. ...................................... 718/105
(58) Field of Classification Search ........ 718/100–105; 709/203–241; 710/20–316
See application file for complete search history.

(56) References Cited

U.S. PATENT DOCUMENTS

| 5,031,094 | A | * | 7/1991 | Toegel et al. ................ 710/316 |
| 5,948,061 | A | * | 9/1999 | Merriman et al. .......... 709/219 |
| 5,951,634 | A | | 9/1999 | Sitbon et al. ................ 709/105 |
| 6,092,178 | A | * | 7/2000 | Jindal et al. .................... 712/27 |
| 6,112,239 | A | * | 8/2000 | Kenner et al. .............. 709/224 |
| 6,115,752 | A | * | 9/2000 | Chauhan ..................... 709/241 |
| 6,128,279 | A | | 10/2000 | O'Neil et al. ................ 370/229 |
| 6,128,642 | A | | 10/2000 | Doraswamy et al. ........ 709/201 |
| 6,167,446 | A | * | 12/2000 | Lister et al. ................. 709/223 |
| 6,233,604 | B1 | * | 5/2001 | Van Horne et al. ......... 709/203 |
| 6,286,039 | B1 | * | 9/2001 | Van Horne et al. ......... 709/221 |
| 6,286,047 | B1 | | 9/2001 | Ramanathan et al. ....... 709/224 |
| 6,381,627 | B1 | | 4/2002 | Kwan et al. ................. 709/201 |
| 6,389,462 | B1 | | 5/2002 | Cohen et al. ................ 709/218 |

(Continued)

OTHER PUBLICATIONS

Bestavros, "WWW Traffic Reduction and Load Balancing Through Server-Based Caching", 1997, IEEE Concurrency, pp. 56-67.*

(Continued)

*Primary Examiner*—Meng-Al T. An
*Assistant Examiner*—Jennifer N. To
(74) *Attorney, Agent, or Firm*—Seed IP Law Group PLLC

(57) ABSTRACT

Server load-balancing operation-related data, such as data associated with a system configured for global server load balancing (GSLB) that orders IP addresses into a list based on a set of performance metrics, is tracked. Such operation-related data includes inbound source IP addresses (e.g., the address of the originator of a DNS request), the requested host and zone, identification of the selected "best" IP addresses resulting from application of a GSLB algorithm and the selection metric used to decide on an IP address as the "best" one. Furthermore, the data includes a count of the selected "best" IP addresses selected via application of the GSLB algorithm, and for each of these IP addresses, the list of deciding performance metrics, along with a count of the number of times each of these metrics in the list was used as a deciding factor in selection of this IP address as the best one. This tracking feature allows better understanding of GSLB policy decisions (such as those associated with performance, maintenance, and troubleshooting) and intelligent deployment of large-scale resilient GSLB networks.

25 Claims, 3 Drawing Sheets

U.S. PATENT DOCUMENTS

| | | |
|---|---|---|
| 6,427,170 B1 | 7/2002 | Sitaraman et al. .......... 709/226 |
| 6,438,652 B1 | 8/2002 | Jordan et al. ................ 711/120 |
| 6,449,657 B1 | 9/2002 | Stanbach, Jr. et al. ....... 709/245 |
| 6,470,389 B1 | 10/2002 | Chung et al. ............... 709/227 |
| 6,480,508 B1 | 11/2002 | Mwikalo et al. ............ 370/475 |
| 6,578,066 B1* | 6/2003 | Logan et al. ................ 718/105 |
| 6,606,643 B1 | 8/2003 | Emens et al. ................ 709/203 |
| 6,681,232 B1 | 1/2004 | Sistanizadeh et al. .... 707/104.1 |
| 6,681,323 B1 | 1/2004 | Fontanesi et al. .............. 713/1 |
| 6,789,125 B1* | 9/2004 | Aviani et al. ................ 709/238 |
| 6,963,914 B1 | 11/2005 | Breibart et al. ............. 709/226 |
| 7,000,007 B1* | 2/2006 | Valenti ........................ 709/219 |
| 2001/0052016 A1 | 12/2001 | Skene et al. ................. 709/226 |
| 2002/0026551 A1* | 2/2002 | Kamimaki et al. .......... 710/260 |
| 2002/0062372 A1* | 5/2002 | Hong et al. ................. 709/225 |
| 2002/0091840 A1* | 7/2002 | Pulier et al. ................. 709/228 |
| 2002/0112036 A1 | 8/2002 | Bohannon et al. .......... 709/220 |
| 2002/0188862 A1 | 12/2002 | Trethewey et al. ......... 713/201 |
| 2002/0194335 A1 | 12/2002 | Maynard .................... 709/225 |
| 2003/0065763 A1 | 4/2003 | Swildens et al. ............ 709/224 |
| 2003/0135509 A1 | 7/2003 | Davis et al. ................. 707/100 |
| 2003/0210686 A1 | 11/2003 | Terrell et al. ............... 370/389 |
| 2003/0210694 A1 | 11/2003 | Jayaraman et al. ......... 370/392 |
| 2004/0024872 A1 | 2/2004 | Kelley et al. ................ 709/225 |
| 2005/0021883 A1* | 1/2005 | Shishizuka et al. ........... 710/20 |
| 2005/0149531 A1 | 7/2005 | Srivastava ................... 707/10 |

OTHER PUBLICATIONS

Paul et al., "Balancing Web Server Load for Adaptable Video Distribution", 2000, IEEE pp. 469-476.*

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

* cited by examiner

STATISTICAL TRACKING OF GLOBAL SERVER LOAD BALANCING FOR SELECTING THE BEST NETWORK ADDRESS FROM ORDERED LIST OF NETWORK ADDRESSES BASED ON A SET OF PERFORMANCE METRICS

BACKGROUND OF THE INVENTION

1. Field of the Invention

The disclosure invention relates generally to load balancing among servers. More particularly but not exclusively, the present disclosure relates to tracking data associated with operation of load balancing systems that provide the address of a server expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

One technique to address these shortcomings is a global server load balancing system provided by Foundry Networks, Inc. of Alviso, Calif. As one example, Foundry provides the ServerIron product to add intelligence to authoritative DNS servers by serving as a proxy to these servers. The ServerIron has a global server load balancing (GSLB) feature that intelligently uses health-checks and other methods to assess the availability and responsiveness of the host sites in the DNS reply. When necessary, the ServerIron exchanges the IP address at the top of the address list returned by the authoritative DNS with another IP address selected from the list, based on a set of performance metrics indicative of which particular host server may provide the optimum access. Thus, the GSLB feature ensures that a client always receives a DNS reply for a host site that is available and is the best choice among the available hosts. Example embodiments for global server load balancing are disclosed in currently pending U.S. application Ser. No. 09/670,487, entitled "GLOBAL SERVER LOAD BALANCING," filed Sep. 26, 2000, assigned to the same assignee as the present application, and which is incorporated herein by reference its entirety.

While this GSLB technique provides improvements in server load balancing, it would be beneficial to be able to provide GSLB operation-related data for purposes of deployment planning, trouble-shooting, maintenance, and the like, for instance.

BRIEF SUMMARY OF THE INVENTION

One aspect of the present invention provides a data-tracking method usable in a system configured for server load balancing. The method includes, in response to a query regarding a domain name, arranging network addresses into an ordered list based on a set of performance metrics related to access conditions to host servers corresponding to the domain name. The ordered list of network addresses is sent as a response to the query, and data related to the query is tracked.

DETAILED DESCRIPTION

Embodiments of statistical tracking associated with load balancing among servers are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a method to track load-balancing operation-related data, such as data associated with a system configured for GSLB that orders IP addresses into a list based on a set of performance metrics. Such operation-related data can include, but not be limited to, inbound source IP addresses (e.g., the address of the originator of a DNS request), the requested host and zone, an identification and count of the selected "best" IP addresses, the selection metric used to decide on a particular best IP address, and a count of the number of times a particular metric was used as a deciding factor in selection of the best IP addresses.

As an example, one of the performance metrics may be a health check associated with querying, either periodically or on demand, host servers and relevant applications hosted on the host servers to determine the "health" (e.g., whether or not it is available). If, for illustrative purposes, the tracking data shows that out of 100 DNS queries, the health check metric was used as the deciding factor 95 times, then this situation may indicate that several servers may be "down," since it suggests that at least some of the servers are failing the health check. System maintenance personnel may then be dispatched to repair the downed servers, or to configure or install new servers that can assist in balancing the load.

In one embodiment, such load-balancing operation-related data can be provided and logged to a server, such as a system log (or "syslog") server. The tracking feature can be enabled/disabled as needed, such as disabling the feature when reporting or troubleshooting is not required.

Figure 1:
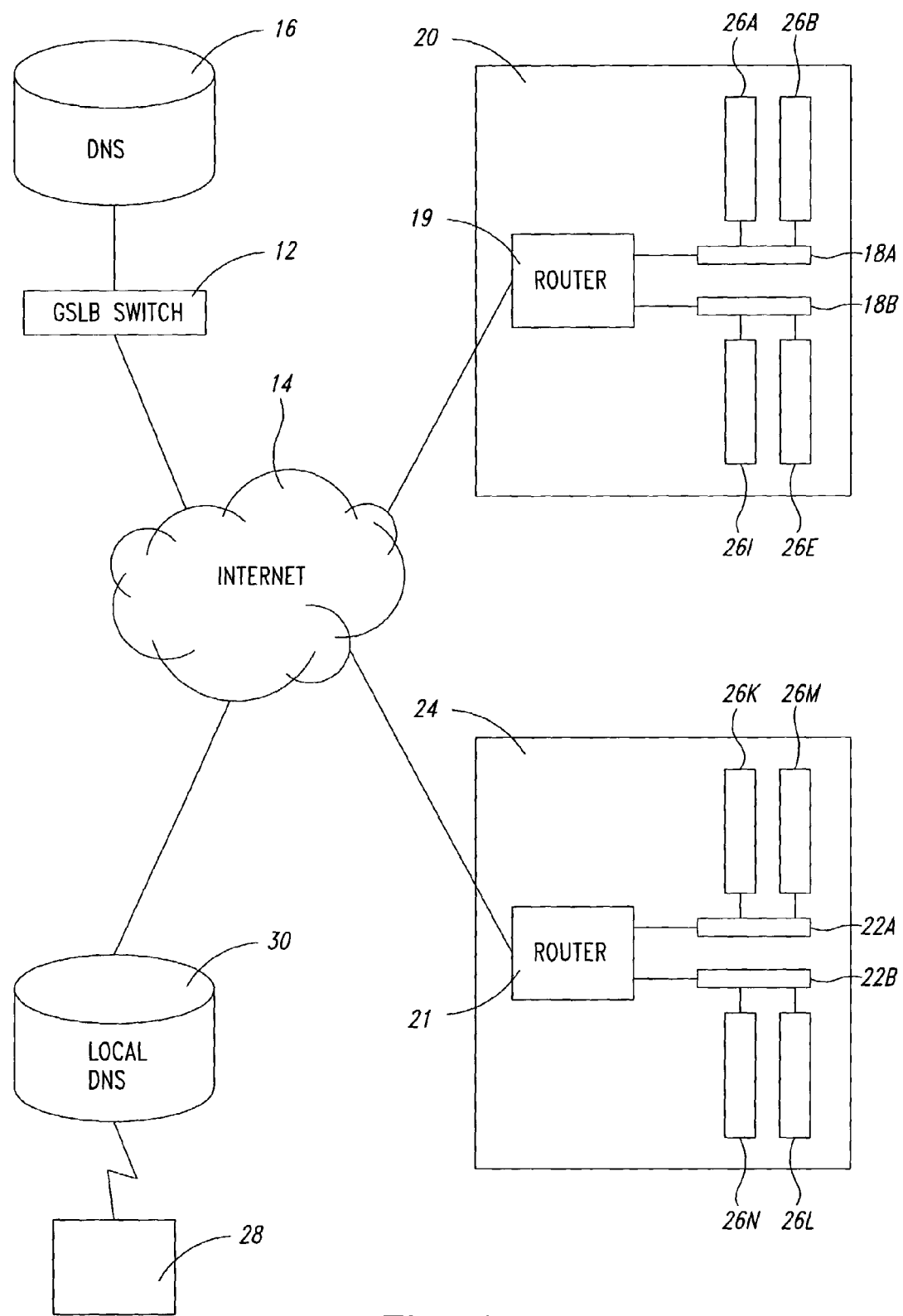
FIG. 1 illustrates a global server load-balancing configuration with which one embodiment of the invention may be implemented.

FIG. 1 illustrates one example global server load-balancing configuration with which an embodiment of the invention may be used. As shown in FIG. 1, GSLB switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet 14 for the authoritative DNS sever of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on performance metrics as described in further detail in currently pending U.S. application Ser. No. 09/670,487 referenced above, and in currently pending U.S. application Ser. No. 10/206,580, entitled "GLOBAL SERVER LOAD BALANCING," filed Jul. 25, 2002, with inventors Sunanda Kommula et al., and assigned to the same assignee as the present application (and disclosing embodiments of a connection-load metric for GSLB). For the sake of brevity, these various performance metrics and the manner in which they are used in a GSLB algorithm to identify best sites in a list of IP addresses are summarized and not described in detail herein. Such additional details may be found in these co-pending applications.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 3:
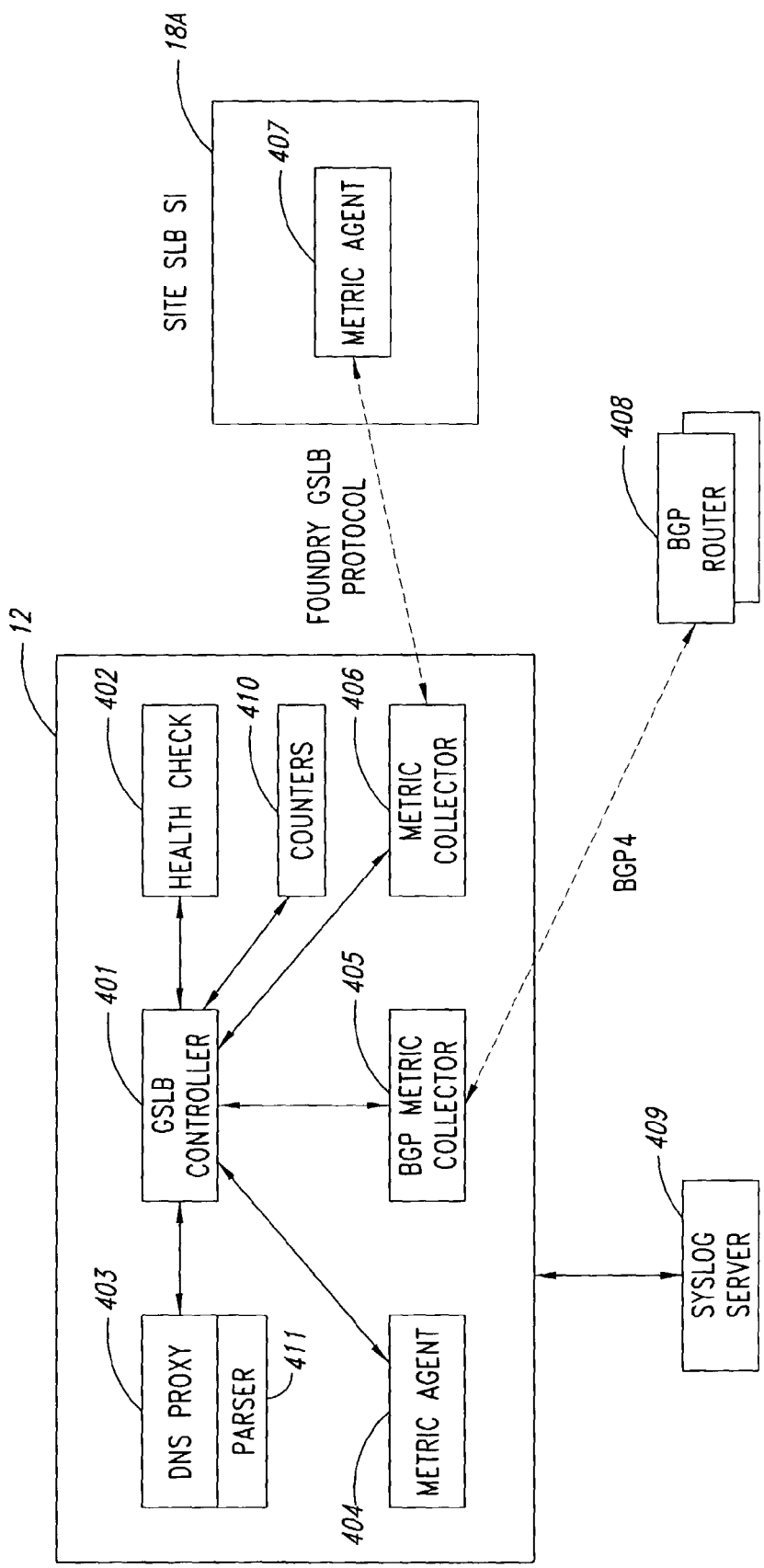
FIG. 3 is a block diagram showing the functional modules of a GSLB switch and a site switch relevant to tracking data associated with the global server load balancing operation in accordance with one embodiment of the invention.

FIG. 3 is a block diagram showing the functional modules of GSLB switch 12 and site switch 18A (for instance) relevant to the global server load balancing function in one embodiment. As shown in FIG. 3, GSLB switch 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing ServerIron or "SLB SI") to collect site-specific metrics (e.g., number of available sessions on a specific host server and/or connection-load data indicative of connections-per-second at that host server).

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment of the present invention, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided site-specific metric agent 404 for collecting metrics for a site-specific metric collector.

One embodiment of the present invention provides a method to track inbound DNS requests. For example, the GSLB switch 12 is provided with capability to track data associated with the originator of the DNS request and with the decision process used to select the best IP address for that DNS request. Such tracking data can include the inbound source IP address of the originator of the DNS request, the requested host names and zone (e.g., for www.gslb.com, the host is "www" and the zone is "gslb.com"), the IP address that was selected as "best" in response to that DNS request, and the particular selection metric that was used to decide on that best IP address. It is appreciated that other types of data associated with the inbound DNS request and with the decision to select an IP address may be tracked by other embodiments of the invention, and that the types of data to be tracked are not restricted to those specifically identified herein.

In an embodiment of the invention, at least some of the data to be tracked can originate from the DNS proxy module 403 in cooperation with the switch controller 401 as needed. For example, since the DNS proxy module 403 receives incoming DNS requests and provides the host names to be resolved to the authoritative DNS server 16 and also receives the replies to the queries from the authoritative DNS server 16, the DNS proxy module 403 can include or otherwise use a parser 411 (or other software component) to identify and extract (from the DNS reply received from the authoritative DNS server 16 in one embodiment and/or from the original request in another embodiment) the source IP address and the requested zone and host.

To track the returned best IP address and the particular metric used to identify this IP address, one embodiment of the invention uses the switch controller 401 to track this information while performing and completing the GSLB algorithm. Alternatively or in addition, the DNS proxy module 403 (via use of the parser 411) may be used to identify and extract the best IP address from the list of responsive IP addresses after completion of the GSLB algorithm.

In an embodiment, one or more servers external to the GSLB switch 12 can be used to receive and log (for storage and subsequent access) the data tracked in the manner described above. An example of such a server is a system log ("syslog") server 409 shown in FIG. 3 that includes a machine-readable storage medium to store the tracked data. The syslog server 409 can be communicatively coupled to the GSLB switch 12 by way of the DNS proxy module 403 or via other communication interface suitable to transfer the tracked data from the GSLB switch 12 to the syslog server 409.

Alternatively or in addition, the data-logging capabilities provided by the syslog server 409 can be configured in the GSLB switch 12 itself, such as a machine-readable storage medium of the GSLB switch 12 that is configured to receive and log the tracked data and to provide accessibility to the logged data for troubleshooting and maintenance purposes. Still alternatively or in addition, syslog servers 409 may be located at the sites 20 and 24, and can be configured to transfer their logged data to other syslog servers 409, if needed, for further processing, storage, and access.

The tracking at the syslog server 409 and/or at the GSLB switch 12 can be enabled or disabled via one or more user (e.g., a system administrator) commands. For instance, a command line interface (CLI) command can be used to enable/disable the logging of all the data, or selective ones of the data in one other embodiment. The CLI command can be entered via any suitable user interface in the GSLB system, and by default in an embodiment, the logging is disabled until later specifically enabled by a CLI command.

A sample output of the syslog server 409, which may be used for troubleshooting, maintenance, or deployment planning purposes is (for a client with a source IP address of 1.1.1.21 sending a DNS query for www.gslb.com):

20:52:02 User.Info 1.1.1.102 GSLB DNS request: src-ip=001.001.001.021 best-ip=001.001.001.101 Host=www Zone=gslb.com Metric=health-check As shown above, this sample output indicates the source IP address, the zone and host, the IP address (1.1.1.101) selected as best, and an identification of which metric (health check) was used to select the best IP address.

Another embodiment of the invention provides counters at the metric-level granularity to count the number of times a particular metric was used as the deciding factor over other metrics in identifying the best IP address. As an additional feature, other counters can be provided that track the number of times each IP address (e.g., VIP address) was selected as the "best" IP address.

FIG. 3 shows one embodiment of the GSLB switch 12 that includes a plurality of counters 410 to count the number of times each particular metric was used to identify the best IP address. While the embodiment of FIG. 3 shows the counters 410 as being separate components, it is appreciated that counting capability can be configured in the metric collectors 405 and 406 or in other components of the GSLB switch 12, or combination of components thereof. According to an embodiment, a separate counter 410 is provided for each VIP, thereby providing a count of how many times that VIP was chosen as the best IP address based on a particular metric. Thus, if VIP-1 was selected 100 times, its metric counter would show that of those 100 times, VIP-1 was selected 20 times based on round trip time (RTT), 40 times based on capacity, 40 times based on round-robin, for example.

In an embodiment, additional counter(s) can be provided to count the number of times (e.g., 100 times in the preceding example) that each VIP is selected. These additional counters can be configured similarly as the counters 410 within the GSLB switch 12, except that they are counting a different type of occurrence.

Again, the count data can be accessed and viewed by a system administrator for purposes of maintenance, troubleshooting, or pre-deployment planning. For instance, if the count data for a particular VIP shows a very high count for the connection-load metric, then this data suggests that the VIP has won over the other choices because the others failed to pass the connection-load limit threshold. This indicates that the other VIPs are facing a very high load of connections-per-second, which signals the system administrator to take proper measures, if that is not intended. Such measures can include, for example, diverting some of the connections to less-busy servers or installing additional servers to handle the heavy load.

As another example, if a system administrator suspects that something is wrong with addresses being provided to Australian clients, the administrator can enable the tracking mechanism to log client requests and DNS replies. In the log data, if an Australian client is given a United States address based on RTT, this may indicate that the more-closer Australian server(s) are down or busy, and therefore need troubleshooting service so that the Australian clients can be provided with the IP addresses for the Australian servers.

With regards to the metrics that are applicable to the tracking operations described above, the metrics used in a GSLB switch 12 in one embodiment include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), and (h) a policy called the "Least Response Selection" (LRS) which prefers the site least selected previously. Many of these performance metrics can be provided default values. Each individual metric can be used in any order, such as an order of (a) through (h) identified above, and each metric can be disabled if desired. In one embodiment, the LRS metric is always enabled.

To briefly describe herein one embodiment of a GSLB algorithm (embodiments of which are described in further detail in the co-pending applications previously identified), assume for purposes of illustration that the metric order is (a) through (h) as identified above. Upon receiving the IP address list from the authoritative DNS server 16, GSLB switch 12 performs, for each IP address on the IP address list (e.g., host server 26I connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. The IP address list is then sent to client program 28. Upon receipt of the IP address list, the client program 28 uses the best IP address selected (i.e., the top of the list) to establish a TCP connection with a host server.

Figure 2:
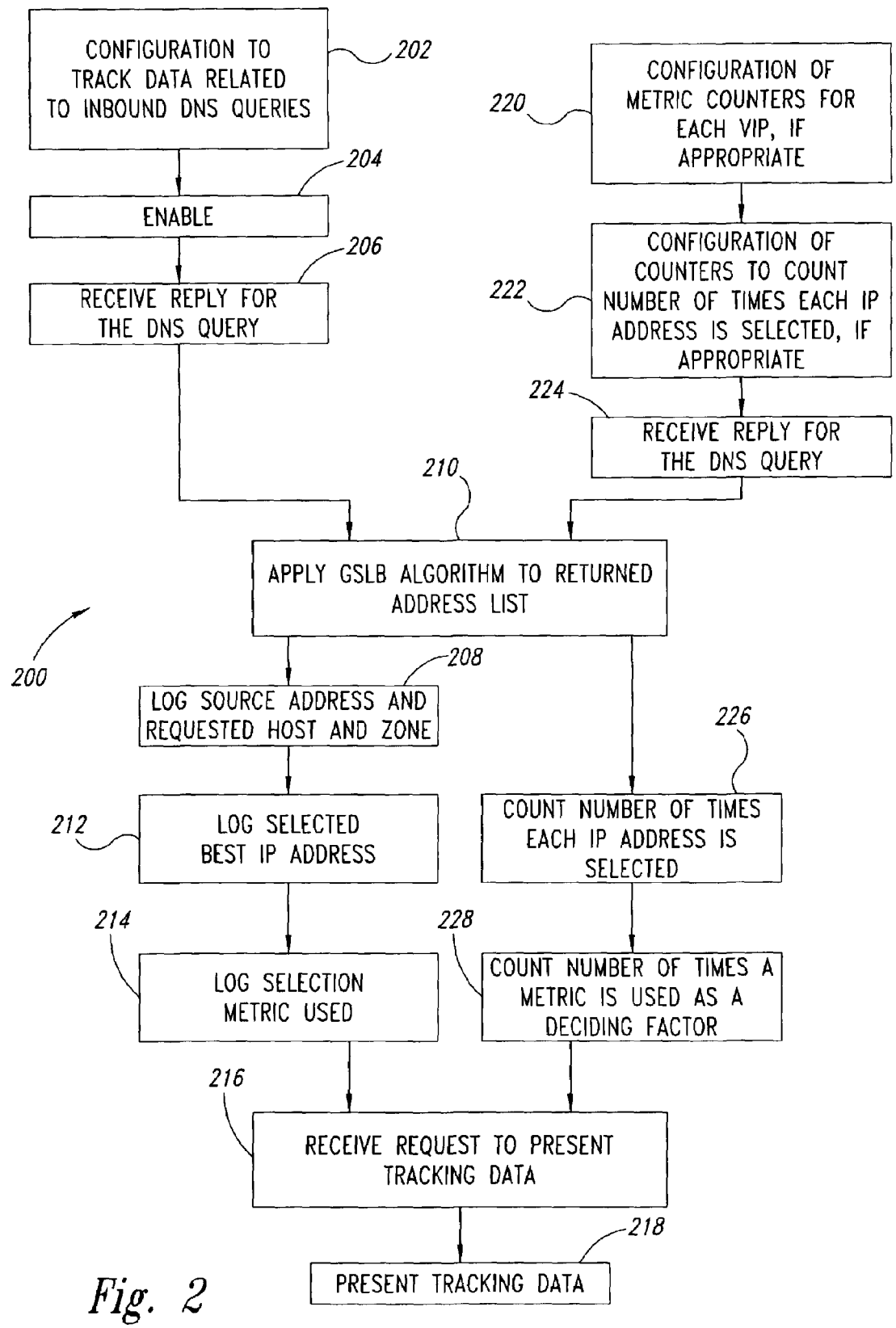
FIG. 2 illustrates in a flow chart one embodiment of a method for tracking data related to global server load balancing.

FIG. 2 illustrates in a flow chart 200 one embodiment of a method for tracking data related to global server load balancing. At least some of the elements of the flowchart 200 may be embodied in software or other machine-readable instructions stored on one or more machine-readable media. Such machine-readable media may be at the GSLB switch 12, at the syslog server 409, at sites 20 or 24, or at other locations or combinations thereof. The flowchart 200 shows two separate concurrent paths, one path for logging data related to inbound DNS queries and another path for counting metric data. It is appreciated that this depiction is for purposes of explanation and clarification, and that in some embodiments, there not need be two separate paths for these operations (e.g., they can be performed sequentially or concurrently within the "same path"). Moreover, the various operations need not necessarily occur in the exact order depicted and that some operations can be eliminated or combined.

Beginning first at a block 202, the GSLB switch 12 and the syslog server 409 are configured to track data related to inbound DNS queries, such as data identifying a source address and requested host and zone, which may be obtained from the reply to the query provided by the authoritative DNS server 16 in one embodiment. Such configuration can include, for instance, adding CLI enabling/disabling feature, identifying which (if not all) data to track, and setting parameters for the data to be tracked (e.g., setting the tracking to occur only during specific hours of certain days, for instance). As another example, it may be desired in some implementations to track the requested hosts and zones, but not necessarily the address of the source of the DNS request.

Once configuration is completed at the block 202, the tracking can be enabled at a block 204. This enablement may be performed by a system administrator via a CLI command in one embodiment described above. Thereafter, tracking data related to received replies to DNS queries at a block 206 can begin.

The DNS reply (to the original query) is received at the block 206 from the authoritative DNS server 16. When an IP address list is returned to the GSLB switch 12 from the authoritative DNS server 16 in the reply, the GSLB algorithm described above is applied to the address list at a block 210. An ordered list of IP addresses results, with the best IP address listed at the top.

The address of the requesting source and the requested host and zone are logged at the block 208 from the reply received from the authoritative DNS server 16. As previously described above, this operation can involve a parsing of the DNS reply by the DNS proxy module 403 in cooperation with the parser 411, followed by logging of the parsed information into the syslog server 409. The parsing of the DNS reply can be performed to find the client's subnet address, in one embodiment, since the reply is destined to the client's local DNS server 30.

Based on this ordered list of IP addresses, the selected best IP address is logged at a block 212. This operation at the block 212 may involve, for instance, parsing the best IP address from the top of the list and sending that IP address to the syslog server 409 for storage as part of the log data to be compiled into statistics. Additionally at a block 214, the particular metric used to select that IP address is logged.

When appropriate, a system administrator or other entity (including automated monitoring agents) sends a request for the tracking data at a block 216. This may be performed, for instance, by accessing the syslog server 409 to request the data stored therein. At a block 218, the requested tracking data is presented, such as via hardcopy computer printout or on a user interface screen.

With regards to the other path of the flowchart 200 related to counting metrics, configuration of the metric counters 410 occurs at a block 220 in implementations where per-metric counting capability can be enabled or disabled through a CLI. In other embodiments, this configuration is not performed. This configuration can involve, for example and in implementations where it is appropriate, assigning counters for each VIP address, correlating the counters to each metric, and so forth. Another possible configuration can involve enabling the counters for only a subset of all performance metrics for a particular VIP address and/or for every VIP address. Additional configuration, if appropriate, may be performed at a block 222 to provide for a count of the number of times each VIP is selected as the best address.

In a response to DNS queries at a block 224 (or at the block 206), lists of IP addresses are returned from the authoritative DNS server 16, and the GSLB algorithm is applied to the address lists at the block 210. At a block 226, the number of times each IP address (or VIP address) is selected is counted. At a block 228, the counters 410 count the number of times a metric is used as a deciding factor over other metrics, for each IP address (or VIP address). It is appreciated that operations related to the counting can be performed, including providing percentages in addition or alternatively to hard counts. The count data may then be requested and presented at blocks 216 and 218, respectively.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computerized method usable in a system configured for load balancing, the method comprising:
   in response to a query, arranging network addresses into an ordered list based on a set of performance metrics; and
   tracking data related to the query, including for a plurality of additional said queries, counting a number of times that a particular performance metric is used as a deciding factor to select a best network address among the ordered list of network addresses.

2. The computerized method of claim 1 wherein tracking the data related to the query further includes tracking, from a reply to the query, an address of a source of the query.

3. The computerized method of claim 1 wherein tracking the data related to the query further includes tracking, from a reply to the query, a requested host and zone.

4. The computerized method of claim 1 wherein tracking the data related to the query further includes tracking which address among the ordered list of network addresses is selected as the best network address in accordance with an algorithm that uses the performance metrics.

5. The computerized method of claim 1 wherein tracking the data related to the query further includes storing the tracked data in a system log server, the method further including configuring the system log server to present the tracked data in response to a command.

6. The computerized method of claim 1, further comprising enabling or disabling the tracking in response to a command.

7. The computerized method of claim 1, further including for the plurality of additional said queries, counting a number of times that a particular network address is selected as the best network address.

8. A computerized method for load balancing among host servers using a load balance switch and plurality of site switches that each couple some of the host servers to a network, the method comprising:

obtaining a set of performance metrics from the site switches that are indicative of access conditions at the host servers;

whenever network addresses are requested by a query, arranging the network addresses as an ordered list in accordance with the obtained set of performance metrics; and tracking data related to the query and compiling the tracked data into statistics, including for a plurality of additional said queries, counting a number of times that each metric from the set of performance metrics is used to select a best network address among the network addresses.

9. The computerized method of claim 8 wherein tracking the data related to the query further includes tracking, from a response to the query, at least one of a source address of the query, a host corresponding to the domain name, and a zone corresponding to the domain name.

10. The computerized method of claim 8 wherein tracking the data related to the query further includes tracking which network address from the ordered list of network addresses is selected as the best network address based on the set of performance metrics.

11. The computerized method of claim 8 wherein compiling the tracked data into statistics includes storing the tracked data in a system log server that is responsive to a command to present the statistics.

12. The computerized method of claim 8, further comprising configuring at least one of the enablement and disablement of the tracking.

13. The computerized method of claim 8, further comprising for the plurality of additional said queries, counting a number of times that a network address is selected as the best network address.

14. An article of manufacture to provide load balancing among host servers using a load balance switch and plurality of site switches that each couple some of the host servers to a network, the article of manufacture comprising:

a machine-readable medium having instructions stored thereon to:

in response to a query, arrange network addresses into an ordered list based on a set of performance metrics related to access conditions to the host servers; and track data related to the arrangement of the network addresses into the ordered list, including instructions to count a number of times that each performance metric is used to select one of the network addresses as an optimum network address.

15. The article of manufacture of claim 14 wherein the instructions to track data related to the arrangement of the network addresses further include instructions to log a source address corresponding to the query and host and zone data.

16. The article of manufacture of claim 14 wherein the instructions to track data related to the arrangement of the network addresses include instructions to:

identify which network address from the list of network addresses is the optimum network address based on application of the performance metrics.

17. The article of manufacture of claim 14 wherein the instructions to track data related to the arrangement of the network addresses include instructions to count a number of times that each network address is selected as optimum.

18. A system to balance load among host servers of a network, each of the host servers being coupled to the network through at least one of a plurality of site switches, the system comprising:

a network device having at least one metric collector to collect performance metric information and a controller configured to use an algorithm to arrange a list of network addresses based on the performance metric information collected by the metric collector and to provide an arranged list of network addresses in response to a query; and a storage area coupled to the controller to receive data from the controller, the storage area having counters that are adapted to use the data provided by the controller to count a number of times each performance metric is used as a deciding factor over other performance metrics in selection of one of the network addresses as an optimum network address.

19. The system of claim 18 wherein the data provided by the controller further includes a source address of the query and information indicative of a requested host and zone, and wherein the network device further includes a proxy module coupled to a parser configured to extract the source address and the host and zone information from the list of network addresses.

20. The system of claim 18 wherein the data provided by the controller further includes identification of a network address selected as optimum by the controller from the list of network addresses.

21. The system of claim 18 wherein the storage area coupled to the controller comprises a server coupled externally to the network device.

22. The system of claim 21 wherein the externally coupled server is configured to present the data provided by the controller as compiled statistics in response to a command that requests the statistics.

23. The system of claim 18 wherein the counters of the storage area are further adapted to use the data provided by the controller to count a number of times that each network address is selected as optimum.

24. An apparatus to balance load among host servers of a network, each of the host servers being coupled to the network through at least one of a plurality of site switches, the apparatus comprising:

a network device adapted to communicate with the plurality of site switches to obtain a plurality of performance metrics, the network device being configurable to arrange a list of network addresses based at least in part on a plurality of performance metrics obtained from the plurality of site switches, the network device further being configurable to identify which performance metric from the plurality of performance metrics is used to decide which network address is optimum, in a manner to allow counting of a number of times that each performance metric is used as a deciding factor over other performance metrics in selection of one of the network addresses as an optimum network address.

25. The apparatus of claim 24 wherein the network device is further configurable to provide data indicative of which network address is selected as the optimum network address, in a manner to allow counting of a number of times that each network address is selected as the optimum network address in response to queries.

* * * * *